United States Patent
Chen et al.

(10) Patent No.: US 10,942,061 B2
(45) Date of Patent: Mar. 9, 2021

(54) SHIELDING FOR ELECTRODES IN PHOTOIONIZATION DETECTOR

(71) Applicant: HONEYWELL INTERNATIONAL INC., Morris Plains, NJ (US)

(72) Inventors: Bo Chen, Morris Plains, NJ (US); Yuzhong June Wang, Morris Plains, NJ (US); Qidao Lin, Morris Plains, NJ (US); Guangli Xie, Morris Plains, NJ (US); Zhanghua Wu, Morris Plains, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/471,172

(22) PCT Filed: Dec. 20, 2016

(86) PCT No.: PCT/CN2016/110990
§ 371 (c)(1),
(2) Date: Jun. 19, 2019

(87) PCT Pub. No.: WO2018/112733
PCT Pub. Date: Jun. 28, 2018

(65) Prior Publication Data
US 2020/0018639 A1    Jan. 16, 2020

(51) Int. Cl.
*G01J 1/08*    (2006.01)
*G01J 1/04*    (2006.01)
(Continued)

(52) U.S. Cl.
CPC .............. *G01J 1/0437* (2013.01); *G01J 1/08* (2013.01); *G01J 1/429* (2013.01); *G01J 1/44* (2013.01); *G01J 2001/444* (2013.01)

(58) Field of Classification Search
CPC .. G01J 1/0437; G01J 1/08; G01J 1/429; G01J 1/44; G01J 2001/444
See application file for complete search history.

(56) References Cited

U.S. PATENT DOCUMENTS 4,013,913 A  *  3/1977  Driscoll ................ G01N 27/66
                                                    313/242
4,398,152 A  *  8/1983  Leveson ............... G01N 27/66
                                                    250/423 P (Continued)

FOREIGN PATENT DOCUMENTS

CN    101006339 A    7/2007
CN    101308125 A    11/2008
(Continued)

OTHER PUBLICATIONS

International Search Report and Written Opinion for Application No. PCT/CN2016/110990, dated Sep. 19, 2017, 7 pages.

(Continued)

*Primary Examiner* — David P Porta
*Assistant Examiner* — Fani Boosalis
(74) *Attorney, Agent, or Firm* — Alston & Bird LLP (57) ABSTRACT

A photoionization detector (100) comprises an ultraviolet radiation source (130); one or more detector electrodes (204 and 205); and a shielding material (206) located between the ultraviolet radiation source (130) and the one or more detector electrodes (204 and 205), wherein the ultraviolet radiation (240) does not directly impinge on any part of the one or more detector electrodes (204 and 205). A method for gas detection comprises exposing a photoionization detector (100) to an environment containing a target gas; and shielding the one or more detector electrodes (204 and 205) from direct impingement from the ultraviolet radiation (240) via the shielding material (206).

13 Claims, 4 Drawing Sheets

(51) Int. Cl.
   *G01J 1/42*      (2006.01)
   *G01J 1/44*      (2006.01)

(56) References Cited

U.S. PATENT DOCUMENTS

| 4,804,846 | A  | * | 2/1989 | Hall | ........................ | G01N 27/66 |
|-----------|----|---|--------|------|--------------------------|------------|
|           |    |   |        |      |                          | 250/288    |
| 6,225,633 | B1 | * | 5/2001 | Sun  | ........................ | G01N 27/66 |
|           |    |   |        |      |                          | 250/281    |

FOREIGN PATENT DOCUMENTS

| CN | 201514403 | U  | 6/2010  |
|----|-----------|----|---------|
| CN | 203376288 | U  | 1/2014  |
| EP | 1059530   | A2 | 12/2000 |
| EP | 2784499   | A1 | 10/2014 |

OTHER PUBLICATIONS

Communication Pursuant to Rules 161(2) and 162 for European Patent Application No. 16924321.9 dated Jul. 26, 2019, 3 pages.
Extended European Search Report for Patent Application No. 16924321.9 dated Jul. 20, 2020, 8 pages.

\* cited by examiner

SHIELDING FOR ELECTRODES IN PHOTOIONIZATION DETECTOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Photoionization detectors (PIDs) employ a lamp to emit photons that ionize gases in the proximity of detector electrodes. An electric field is established between the plates of the electrodes by an applied voltage bias. The electric field induces ionized particles to move to one or another plate, thereby establishing an electric current between the electrodes. The electric current can be processed to provide an indication of the presence of one or more ionizable gasses. For example, PIDs may be used to detect the presence and/or concentration of volatile organic compounds (VOCs), which can pose a threat to human beings.

SUMMARY

In an embodiment, a PID may comprise an ultraviolet radiation source; one or more detector electrodes; and a shielding material located between the ultraviolet radiation source and the one or more detector electrodes, wherein the ultraviolet radiation does not directly impinge on any part of the one or more detector electrodes.

In an embodiment, a method for gas detection may comprise exposing a PID to an environment containing a target gas, wherein the PID comprises; an ultraviolet radiation source configured to produce ultraviolet radiation; one or more detector electrodes; and a shielding material located between the ultraviolet radiation source and the one or more detector electrodes; and shielding the one or more detector electrodes from direct impingement from the ultraviolet radiation via the shielding material.

In an embodiment, an electrode assembly for use with a PID, the electrode assembly may comprise a first electrode; a second electrode configured to interact with the first electrode to detect ionized gases; and a shielding material configured to shield at least three sides of the first electrode and at least three sides of the second electrode, and configured to block ultraviolet radiation from directly impinging on the first electrode and the second electrode.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for shielding detector electrodes within a PID from ultraviolet radiation. Some electrodes may comprise some shielding to prevent UV radiation from directly impinging on the electrodes and affecting the signal output from the electrodes. However, in some solutions, the side surfaces of the electrodes may be exposed to UV radiation, causing the electrodes to emit electrons and increasing the electronic noise in the output signal.

Embodiments of the disclosure comprise a shielding material configured to cover at least three sides of the detector electrodes in a PID. The shielding material may extend all the way to the top surface of the electrodes. By providing substantial or nearly complete shielding of the electrodes from the radiation, the output signal can be improved, and thus the accuracy of the detected gas concentration can be improved.

Figure 1:
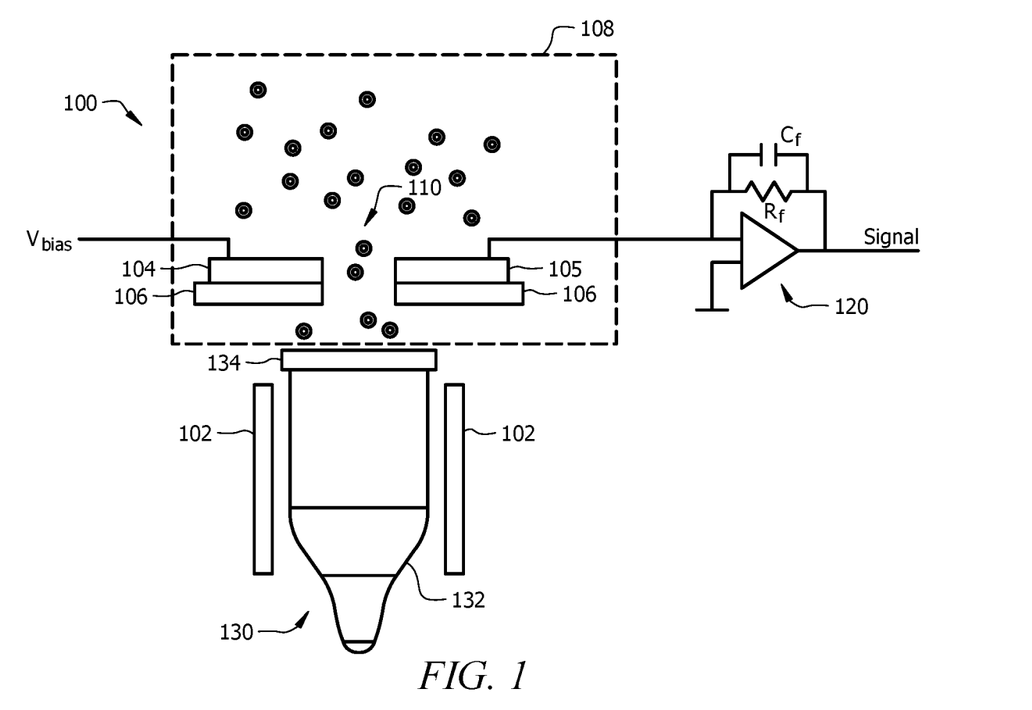
FIG. 1 illustrates a schematic drawing of a PID according to an embodiment.

Referring now to FIG. 1, an exemplary PID system 100 is shown. The PID system 100 may comprise a UV lamp 130 configured to act as a light source and generate light and/or radiation. In other embodiments, the PID system 100 may comprise another light source. While described as light, the radiation may or may not be in the visible spectrum. In general, the radiation can be selected to ionize one or more gasses of interest (e.g., target gas(es)) where the wavelength or wavelength range of the radiation may be suitable for ionizing the target gas(s). In some embodiments, the UV lamp 130 may be located proximate to one or more excitation electrodes 102.

The UV lamp 130 may function as a UV light source for the PID system 100. In some embodiments, the UV lamp 130 may produce vacuum ultraviolet (VUV) radiation. In some embodiments, the UV lamp 130 may comprise one or more noble gasses sealed inside the sealed tube 132. UV light can be generated inside the UV lamp 130 by applying high voltage AC power via two excitation electrodes 102 located outside the UV lamp 130. The UV light generated inside the lamp 130 may pass through the crystal window 134 to the outside of the lamp 130.

The PID system 100 may be located proximate to the crystal window 134, and may comprise an ionization chamber 108. The ionization chamber 108 may comprise detector electrodes 104 and 105 inside the ionization chamber 108, configured to detect the ionization of the gas molecules 110 within the ionization chamber 108. In some embodiments, the detector electrodes 104 and 105 may comprise a shielding material 106 located between the electrodes 104 and 105 and the UV light source (or UV lamp 130).

In use, the gas molecules 110 from the environment may enter the ionization chamber 108, the gas molecules 110 may absorb the energy of the UV light from the UV lamp 130, and then the gas molecules 110 may be ionized. The ionized particles can produce a current by their movements within the ionization chamber 108 to one or both electrodes 104, 105, which may be detected as a current and/or potential difference between electrodes 104 and 105. In order to induce the movement of the ionized molecules, a field may be applied between the detector electrodes 104 and 105. The ions formed by interaction with the light source may be drawn to the detector electrodes 104 and 105, thereby causing an electrical current to flow through the associated detector circuitry 120. The circuitry 120 can be configured to output a voltage signal and/or a current signal, which can indicate a concentration of one or more target gases in the ionization chamber 108.

Because of the shielding of the surfaces of the electrodes 104 and 105 from the UV radiation using the shielding material 106, the intensity of the UV radiation that is passed through the electrodes may be increased (i.e. increased from the intensity typically used), thereby increasing the output signal of the electrodes 104 and 105. The intensity may be increased by increasing the amount of UV radiation that is directed into the ionization chamber 108 via the crystal window 134. Increasing the intensity may also increase the UV luminous flux. Shielding the electrodes 104 and 106 via the shielding material 106 may decrease the noise in the output signal of the associated circuitry 120.

In some embodiments, the side surfaces of the electrodes 104 and 105 may also be shielded from the UV radiation. However, shielding the side surfaces of the electrodes 104 and 105 may change the electrical communication between the electrodes. To counteract any decrease in signal strength caused by the shielding material 106, other parameters of the circuitry 120 may be optimized.

For example, the feedback resistance ($R_f$), the feedback capacitance ($C_f$) and the bias voltage ($V_{bias}$) may be optimized to further reduce noise in the output signal. The signal-to-noise ratio (SNR) may be improved by adjusting the above parameters, thereby improving the resolution of the output signal.

Figure 2A:
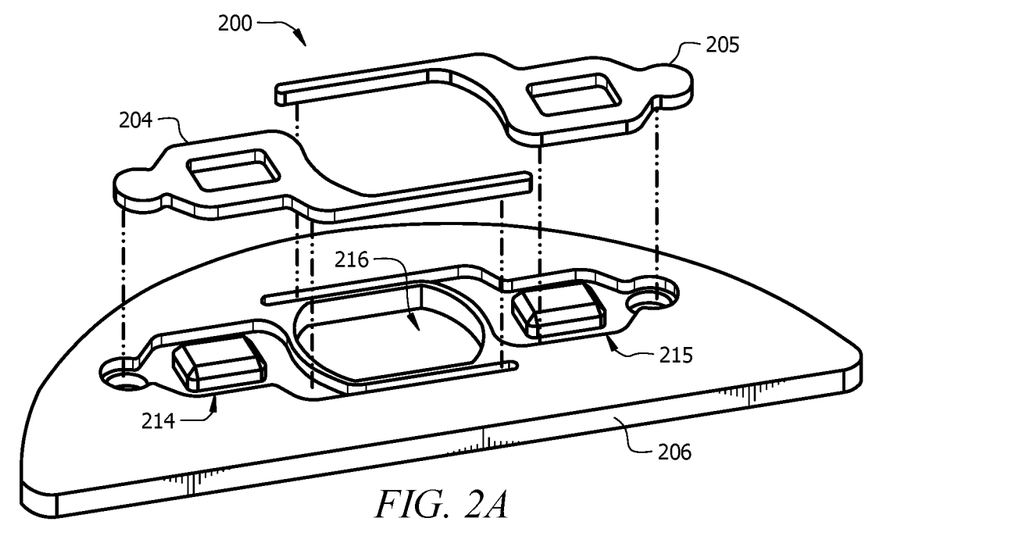
FIG. 2A illustrates an exploded view of an electrode assembly according to an embodiment.
Figure 2B:
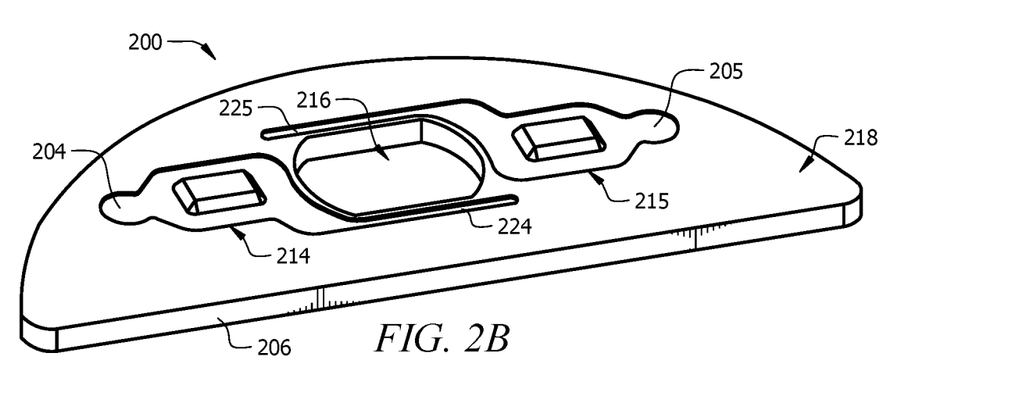
FIG. 2B illustrates a perspective view of an electrode assembly according to an embodiment.

Referring now to FIGS. 2A-2B, an exemplary embodiment of an electrode assembly 200 comprising electrodes 204 and 205 is shown. The electrodes 204 and 205 may be similar to the detector electrodes 104 and 105 described above. The electrodes may comprise a first electrode 204 and a second electrode 205. In some embodiments, the electrodes 204 and 205 may comprise a counter electrode and a sensing electrode.

As shown in FIGS. 2A-2B, the electrode assembly 200 may comprise a shielding material 206 which may be configured to attach to the electrodes 204 and 205. In some embodiments, the shielding material 206 may be similar to shielding material 106 described above. The shielding material 206 may be located between the electrodes 204 and 205 and a UV radiation source (as described above). In some embodiments, the shielding material 206 may comprise an opening 216 allowing air flow through the electrode assembly 200. In some embodiments, the shielding material 206 may comprise a first channel 214 configured to receive the first electrode 204. In some embodiments, the shielding material 206 may comprise a second channel 215 configured to receive the second electrode 205. In some embodiments, the electrodes 204 and 205 may comprise a collection surface 224 and 225, which may comprise an elongated section positioned adjacent to the opening 216. The collection surfaces 224 and 225 may be configured to collect ions from the ionized target gas as it passes through the opening 216.

As shown in FIG. 2B, when assembled, the shielding material 206 may be configured to cover at least three sides of the electrodes 204 and 205. In other words, the shielding material 206 may contact all surfaces of the electrodes 204 and 205 except for the top surface. Particularly, near the opening 216, the shielding material 206 may prevent UV light from impinging on the bottom surface and the two side surfaces of the electrodes 204 and 205. The top surface of the electrodes 204 and 205 may remain exposed to allow electrical communication between the electrodes 204 and 205. In some embodiment, the shielding material may comprise Teflon. While the shielding material may not cover the top surface, the positioning of the shielding material relative to the radiation source may result in the exposed surface being shielded from the radiation. For example the exposed surface may be in a shadow created by the shielding material. This can allow the surface to be exposed in the sensor without having the radiation directly shine on or impinge on the exposed surface.

As shown in FIGS. 2A and 2B, the electrodes 204, 205 can be disposed entirely within the channel 214, 215, respectively, in some embodiments. In these embodiments, the exposed surface of one or more of the electrodes 204, 205 can be disposed below a surface defined by the top of the channel 214, 215 while the remaining surfaces of the electrodes 204, 205 are in contact with or disposed in the shielding material 206.

The improved shielding of the electrodes 204 and 205 provided by the shielding material may result in decreased noise levels in the output signal, higher sensitivity to target gases, higher resolution in readings, and/or improved stabilization and a smaller drift for the baseline of the PID.

Figure 3:
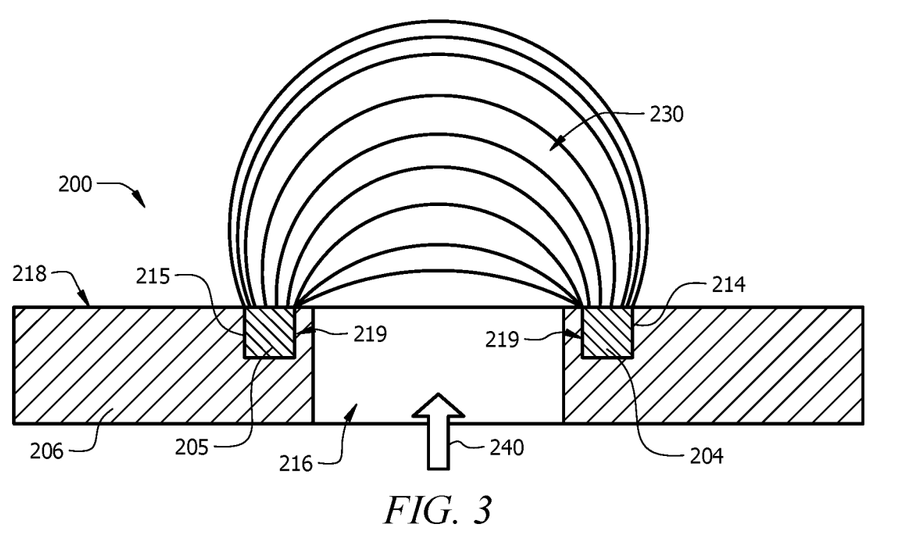
FIG. 3 illustrates a cross-sectional view of an electrode assembly according to an embodiment.

FIG. 3 illustrates a cross-sectional view of the electrode assembly 200. An example of a static electric field 230 between the two electrodes 204 and 205 is shown. UV light 240 from a light source may pass through the opening 216 of the shielding material 206, between the electrodes 204 and 205. The shielding material 206 may prevent the UV light 240 from impinging on any surfaces of the electrodes 204 and 205. In some embodiments, the collection surfaces 224 and 225 may be configured to collect ions from the ionized target gas as it passes through and/or by the opening 216 and into the space covered by the static electric field 230.

As shown in FIG. 2B and FIG. 3, the shielding material 206 may define a plane at the top surface 218 of the shielding material, where, when assembled, the electrodes 204 and 205 may be located completely at and below that plane. The shielding material 206 may comprise one or more "wall" portions 219 located between the opening 216 and the surface of the electrodes 204 and 205. The wall portions 219 may form a portion of the channels 214 and 215 configured to hold the electrodes 204 and 205.

In some embodiments, the electrodes 204 and 205 may be spaced (across the opening 216) at least approximately 6 millimeters (mm) apart. In some embodiments, the collection surfaces 224 and 225 of the electrodes 204 and 205 may be spaced (across the opening 216) at least approximately 6 mm apart. In some embodiments, the electrodes 204 and 205 may be spaced between 2 mm and 10 mm apart. In some embodiments, the electrodes 204 and 205 may be spaced between 1 mm and 30 mm apart. In some embodiments, the collection surfaces 224 and 225 of the electrodes 204 and 205 may be spaced (across the opening 216) approximately 7.5 mm apart. In some embodiments, the collection surfaces 224 and 225 of the electrodes 204 and 205 may be spaced between 2 mm and 10 mm apart. In some embodiments, the collection surfaces 224 and 225 of the electrodes 204 and 205 may be spaced between 1 mm and 30 mm apart. In some embodiments, the opening 216 may comprise a width of approximately 7 mm. In some embodiments, the opening 216 may comprise a width of between 2 mm and 10 mm. In some embodiments, the opening 216 may comprise a width of between 1 mm and 30 mm.

Figure 4:
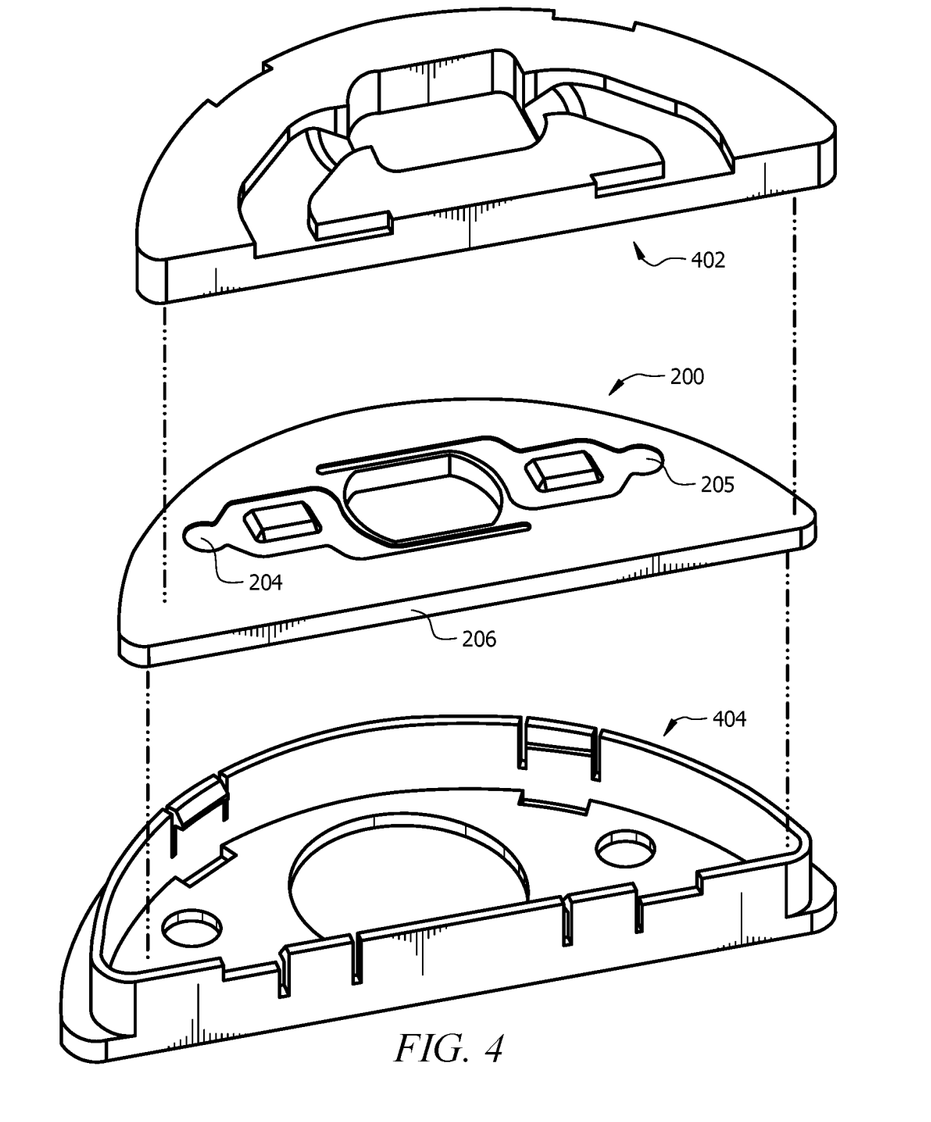
FIG. 4 illustrates an exploded view of an electrode assembly according to an embodiment.

Referring to FIG. 4, the electrode assembly 200 may be further assembled with housing elements 402 and 404. The housing elements 402 and 404 may protect the electrode assembly 200 and allow a user to handle the electrode assembly 200 without damage to the assembly 200 and/or injury to the user. The housing elements 402 and 404 may also function as a gas path for directing airflow through the electrode assembly. The housing elements 402 and 404 may also provide electrical insulation.

Having described various devices and methods herein, exemplary embodiments or aspects can include, but are not limited to:

In a first embodiment, a PID may comprise an ultraviolet radiation source; one or more detector electrodes; and a shielding material located between the ultraviolet radiation source and the one or more detector electrodes, wherein the ultraviolet radiation does not directly impinge on any part of the one or more detector electrodes.

A second embodiment can include the PID of the first embodiment, wherein the shielding material is configured to contact at least three sides of the one or more detector electrodes.

A third embodiment can include the PID of the first or second embodiments, wherein the shielding material comprises one or more channels, and wherein the one or more detector electrodes are configured to fit within the one or more channels.

A fourth embodiment can include the PID of any of the first to third embodiments, wherein a top surface of the shielding material defines a plane, and wherein the electrodes are located at or below the defined plane.

A fifth embodiment can include the PID of any of the first to fourth embodiments, wherein the shielding material comprises Teflon.

A sixth embodiment can include the PID of any of the first to fifth embodiments, wherein the one or more detector electrodes comprise a counter electrode and a sensing electrode.

A seventh embodiment can include PID of any of the first to sixth embodiments, further comprising detector circuitry, wherein the detector circuitry is optimized to reduce noise in an output signal from the one or more detector electrodes.

An eighth embodiment can include the PID of any of the first to seventh embodiments, wherein the one or more detector electrodes comprise a collection surface configured to interact with ionized gases.

A ninth embodiment can include the PID of any of the first to eighth embodiments, wherein the shielding material comprises an opening configured to allow a target gas to pass between the detector electrodes, and wherein at least a portion of the shielding material is located between the opening and the detector electrodes.

In a tenth embodiment, a method for gas detection may comprise exposing a PID to an environment containing a target gas, wherein the PID comprises; an ultraviolet radiation source configured to produce ultraviolet radiation; one or more detector electrodes; and a shielding material located between the ultraviolet radiation source and the one or more detector electrodes; and shielding the one or more detector electrodes from direct impingement from the ultraviolet radiation via the shielding material.

An eleventh embodiment can include the method of the tenth embodiment, further comprising ionizing the target gas using the ultraviolet radiation; detecting, by the one or more detector electrodes, the electric current produced by the ionization, while the ultraviolet radiation does not contact the one or more detector electrodes; and determining the concentration of the sample gas based on the detected electric current.

A twelfth embodiment can include the method of any of the tenth to eleventh embodiments, wherein shielding comprises preventing ultraviolet light from directly impinging on any part of the one or more detector electrodes.

A thirteenth embodiment can include the method of any of the tenth or twelfth embodiments, wherein shielding comprises covering at least three sides of the one or more electrodes.

A fourteenth embodiment can include the method of any of the tenth to thirteenth embodiments, further comprising passing the target gas through an opening in the shielding material, between the detector electrodes, and wherein shielding comprises providing shielding material between the opening and the detector electrodes.

A fifteenth embodiment can include the method of any of the tenth to fourteenth embodiments, wherein the PID further comprises detector circuitry, and wherein the method further comprises optimizing at least one of resistance, capacitance, and voltage within the detector circuitry to decrease noise in an output signal from the detector electrodes.

In a sixteenth embodiment, an electrode assembly for use with a PID, the electrode assembly may comprise a first electrode; a second electrode configured to interact with the first electrode to detect ionized gases; and a shielding material configured to shield at least three sides of the first electrode and at least three sides of the second electrode, and configured to block ultraviolet radiation from directly impinging on the first electrode and the second electrode.

A seventeenth embodiment can include the electrode assembly of the sixteenth embodiment, further comprising a housing configured to contain and protect the first and second electrodes.

An eighteenth embodiment can include the electrode assembly of the sixteenth or seventeenth embodiments, wherein the shielding material is located between an ultraviolet radiation source and the first and second electrodes, and wherein the ultraviolet radiation does not directly impinge on any part of the first and second electrodes.

A nineteenth embodiment can include the electrode assembly of any of the sixteenth to eighteenth embodiments, wherein the shielding material comprises an opening configured to allow a target gas to pass between the first and second electrodes, and wherein at least a portion of the shielding material is located between the opening and the first and second electrodes.

A twentieth embodiment can include the electrode assembly of any of the sixteenth to nineteenth embodiments, wherein the shielding material is configured to contact at least three sides of the first electrode and contact at least three sides of the second electrode.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A photoionization detector comprising:
   an ultraviolet radiation source;
   one or more detector electrodes;
   a shielding material located between the ultraviolet radiation source and the one or more detector electrodes, wherein ultraviolet radiation from the ultraviolet radiation source does not directly impinge on any part of the one or more detector electrodes; and
   detector circuitry configured to reduce noise in an output signal from the one or more detector electrodes.

2. The photoionization detector of claim 1, wherein the shielding material is configured to contact at least three sides of the one or more detector electrodes.

3. The photoionization detector of claim 1, wherein the shielding material comprises one or more channels, and
   wherein the one or more detector electrodes are configured to fit within the one or more channels.

4. The photoionization detector of claim 1, wherein a top surface of the shielding material defines a plane, and
   wherein the one or more detector electrodes are located at or below the defined plane.

5. The photoionization detector of claim 1, wherein the shielding material comprises Teflon.

6. The photoionization detector of claim 1, wherein the one or more detector electrodes comprise a counter electrode and a sensing electrode.

7. The photoionization detector of claim 1, wherein the one or more detector electrodes comprise a collection surface configured to interact with ionized gases.

8. The photoionization detector of claim 1, wherein the shielding material comprises an opening configured to allow a target gas to pass between the one or more detector electrodes, and
    wherein at least a portion of the shielding material is located between the opening and the one or more detector electrodes.

9. A method for gas detection comprising:
    exposing a photoionization detector to an environment containing a target gas, wherein the photoionization detector comprises:
        a radiation source configured to produce radiation;
        one or more detector electrodes;
        a shielding material located between the radiation source and the one or more detector electrodes; and
        a detector circuitry;
    shielding the one or more detector electrodes from direct impingement from the radiation via the shielding material; and
    optimizing at least one of resistance, capacitance, and voltage within the detector circuitry to decrease noise in an output signal from the one or more detector electrodes.

10. The method of claim 9, further comprising:
    ionizing the target gas using the radiation;
    detecting, by the one or more detector electrodes, an electric current produced by the ionization, while the radiation does not contact the one or more detector electrodes; and
    determining a concentration of the target gas based on the detected electric current.

11. The method of claim 9, wherein shielding comprises preventing the radiation from directly impinging on any part of the one or more detector electrodes.

12. The method of claim 9, wherein shielding comprises covering at least three sides of the one or more detector electrodes.

13. The method of claim 9, further comprising passing the target gas through an opening in the shielding material, between the one or more detector electrodes, and wherein shielding comprises providing the shielding material between the opening and the one or more detector electrodes.

* * * * *